(12) United States Patent
Alcini

(10) Patent No.: US 6,357,841 B1
(45) Date of Patent: Mar. 19, 2002

(54) EJECTABLE COMPACT DISC CONTAINER

(76) Inventor: Charles G. Alcini, 3827 Lake George Rd., Dryden, MI (US) 48428

( * ) Notice: Subject to any disclaimer, the term of this patent is extended or adjusted under 35 U.S.C. 154(b) by 25 days.

(21) Appl. No.: 09/602,764

(22) Filed: Jun. 23, 2000

(51) Int. Cl.[7] .............................................. A97B 81/06
(52) U.S. Cl. ..................................... 312/9.27; 312/9.41
(58) Field of Search ............................. 312/9.11, 9.27, 312/9.23, 9.28, 9.41, 9.53, 9.54, 9.56; 206/308.1, 387.12

(56) References Cited

U.S. PATENT DOCUMENTS

| | | | | |
|---|---|---|---|---|
| 1,096,887 A | * | 5/1914 | Blaski | 312/9.54 |
| 1,878,659 A | * | 9/1932 | Bader | 312/9.23 |
| 2,297,079 A | * | 9/1942 | Shonle | 206/308.1 |
| 4,655,344 A | * | 4/1987 | Ackeret | 206/309 |
| 4,728,157 A | * | 3/1988 | David, Jr. | 312/12 |
| 4,842,348 A | * | 6/1989 | Ackeret | 312/4.41 |
| 5,170,893 A | * | 12/1992 | Smith | 312/9.54 |
| 5,495,939 A | * | 3/1996 | Castritis | 206/308.1 |
| 5,503,470 A | * | 4/1996 | Lu | 312/9.41 |
| 5,611,607 A | * | 3/1997 | Kuzara et al. | 312/9.54 |
| 5,676,246 A | * | 10/1997 | Gloger | 206/308.1 |
| 5,730,283 A | * | 3/1998 | Lax | 312/9.41 |

FOREIGN PATENT DOCUMENTS

| | | | |
|---|---|---|---|
| WO | 9506608 | * | 3/1995 |
| WO | 9929594 | * | 6/1999 |

* cited by examiner

Primary Examiner—Peter M. Cuomo
Assistant Examiner—Jerry Anderson
(74) Attorney, Agent, or Firm—Rader, Fishman & Grauer PLLC

(57) ABSTRACT

An ejectable compact disc container comprises a housing, an ejector arm, and an ejector link. The housing is solid on five of its six sides, the sixth side of the housing is articulated on one of its ends to a lateral side of the housing and constitutes a lid of the housing. The ejector arm is located in the housing and engages the edge of the compact disc distant from the lid. The ejector arm is operable through a pivotal connection to the ejector link, which is connected to and actuated by the lid. Thus, upon opening the lid, the compact disc is pushed out of the housing.

9 Claims, 6 Drawing Sheets

EJECTABLE COMPACT DISC CONTAINER

BACKGROUND OF THE INVENTION

1. Field of the Invention

The present invention relates to the storage of recording media, for example compact discs. More particularly, the invention relates to a compact disc (CD) container. Still more particularly, it relates to a container that allows ejecting compact discs upon opening the container.

2. Description of the Related Art

Containers currently being used to store compact discs comprise a base member having a cover or top member hingeably connected along one edge thereof. A generally circular formation of a plurality of upwardly extending resiliently deformable fingers is generally centrally located within the base member. In moving from the base member, the fingers first extend inwardly and at their uppermost ends extend outwardly. The upper parts of the fingers define a support, on which a compact disc may be located. The support is resiliently deformed as a compact disc is pushed onto it with the fingers flexing inwardly and then outwardly to bear against the central aperture in the disc and allow the disc to be held firmly in position.

To remove a disc from such a container, a user must uncouple the top and bottom members of the container and pivot the top member about the hinge connection. The user then must push down on the upper ends of the fingers of the support for the compact disc and, at the same time, grasp the edges of the disc and lift it away from the support. It will be appreciated that these disc containers can be difficult to open to enable releasing a disc being stored therein. After it has been opened, young children with small hands find it particularly difficult to apply the necessary force to extract a compact disc from the container.

Arrangements seeking to alleviate or overcome the noted difficulties are also known in the art.

U.S. Pat. No. 4,655,344 discloses a housing for a plurality of holders for compact discs. Each holder for a compact disc is provided with a helical torsion spring, with the longer spring arm extending obliquely toward the rear wall of the housing. Each holder is biased in the ejection direction since the spring is normally in the "loaded" condition. There is also a release button, and it is possible to release the holder from the locked position within the housing by pressing the release button.

U.S. Pat. No. 4,728,157 discloses an ejectable compact disc case. To remove the disc from the case, an actuator bar, whose end projects outside the case, is pushed toward rear wall of the case. A pivot arm of a drive lever cooperates with the actuator bar in a rack-and-pinion manner. The pivot arm rotates, and the rotation is translated into a linear movement of a sliding arm in the direction opposite to that of the actuator bar. A ring secured thereto supports a disc. Therefore, the disc, in its linear movement towards a front wall of the case, which is hinged to a top or bottom wall thereof, opens the front wall. A spindle is also provided within the ring. Once the spindle passes the end of the bottom wall, it pivots downwardly and thereby frees the disc.

An ejectable compact disc container according to U.S. Pat. No. 5,265,721 allows the user to open the container and eject the disc into a CD player using only one hand. The user opens a front wall of the container pivotally connected thereto and slides a knob in a slot made in a cover portion of the container. The knob is secured to a tray portion carrying the disc. The user then holds the container adjacent to the player so as to enable the latter to grasp the disc and remove it from the tray portion. U.S. Pat. No. 5,495,939 improved the previous one in terms of at providing means for stopping the forward movement of the disc-supporting tray.

International Publication No. WO 95/05661 and U.S. Pat. No. 5,676,246 disclose a compact disc container having a slot in one edge through which the disc can be slid into and out of the container and a pivotally mounted ejector for engaging an edge of the disc to displace it at least partly from the container. The disc ejector comprises an arm movable in the container and having a curved portion complementary to the shape of the edge of the disc. The arm is coupled by a web to a user operable trigger located outside the container and pivotally secured thereto.

UK Pat. Application No. 2 297 079 discloses a compact disc container in the form of a shallow box, the entry to which is arranged through one of the narrow sides so that the disc is slid in and out edgewise. There is a thin flexible liner shielding the disc, or it may be received in a tray. The main face of the container is provided with a slot so that the disc can be worked by finger or thumb.

International Pat. Publication No. WO 95/06608 discloses a compact disc storage box, in which side walls have thin flexible end portions for allowing the release of the disc by pushing inwardly on the end portion, making the bottom wall return to a molded curvature and partially ejecting the disc. International Pat. Publication No. WO 99/29594 discloses a compact disc storage case including a plastic box and a spring inside the box adjacent its rear side. One part of the spring is fixedly secured to the box, whereas a movable part when released can eject the disc.

The above-described compact disc containers are fairly complex in design that presents certain disadvantages in the process of manufacturing them.

SUMMARY OF THE INVENTION

It is therefore a principal object of the present invention to provide an ejectable compact disc container that, while preserving the advantages of the known compact disc containers, would be free of their drawbacks.

The above objective is met in the invention by virtue of an ejectable compact disc container comprising a housing and means for ejecting a compact disc from the housing. The housing is made in the form of a parallelepiped that is closed on five of its six sides, whereas the sixth side of the housing is articulated on one of its ends to a side wall of the housing, thus constituting a lid of the housing. The ejecting means engage the compact disc and are operated by the lid. Due to that, the compact disc is being received into the container upon closing the lid, and the disc is pushed out of the container upon opening the lid.

The ejecting means include an ejector arm, and an ejector link. The ejector arm is located in the housing, adapted to engage an edge of the compact disc distant from the lid, and operable through a pivotal connection to the ejector link, which in turn is adapted to be actuated by the lid.

The container also comprises a divider placed within the housing. The plane of the divider is substantially parallel to planes of front and back panels of the housing, so two compartments are formed within the housing. One of the compartments accommodates the compact disc, and it is in this compartment that the ejector arm and ejector link are located.

The surface of the back panel and a surface of the divider facing each other can be covered with a protective lining.

To facilitate placing the disc into the container, the edge of the divider adjacent to the lid can be beveled to form a lead-in area for the disc.

The compartment accommodating the compact disc is located between the divider and the back panel, whereas in the compartment located between the divider and the front panel the latter is made clear to thus allow contents of this compartment to be visible from outside.

The ratio of dimensions between the ejector link and the ejector arm, as well as the stroke of the ejector link between its extreme positions at a full-open and full-closed positions of the lid are selected in such a way that the compact disc be ejected past its center hole to facilitate easy removal of the disc.

It will be understood that overall dimensions of the case according to the present invention will not depart from those adopted by the industry, so the case can be readily kept in storage racks, cabinets, etc., now on the market.

BRIEF DESCRIPTION OF THE DRAWING

These and other objects, features and advantages of the present invention will be more clearly understood from the ensuing description when considered with the reference to accompanying drawings wherein.

DESCRIPTION OF THE PREFERRED EMBODIMENT

Figure 3:
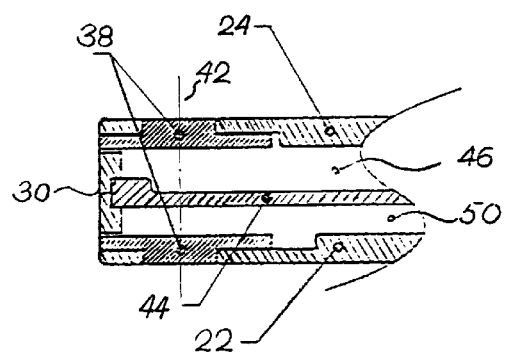
FIG. 3 is an enlarged partial cross-sectional view taken along line 3—3 of FIG. 1.
Figure 5:
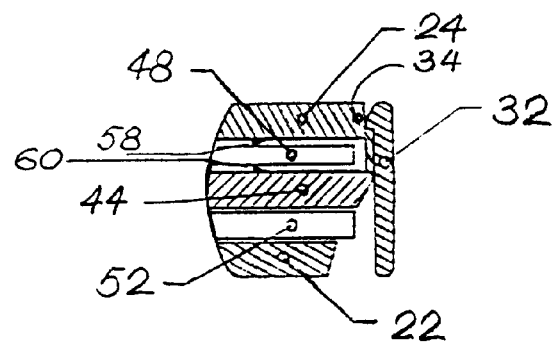
FIG. 5 is an enlarged view of a portion 5 of the container as shown in FIG. 2.
Figure 6:
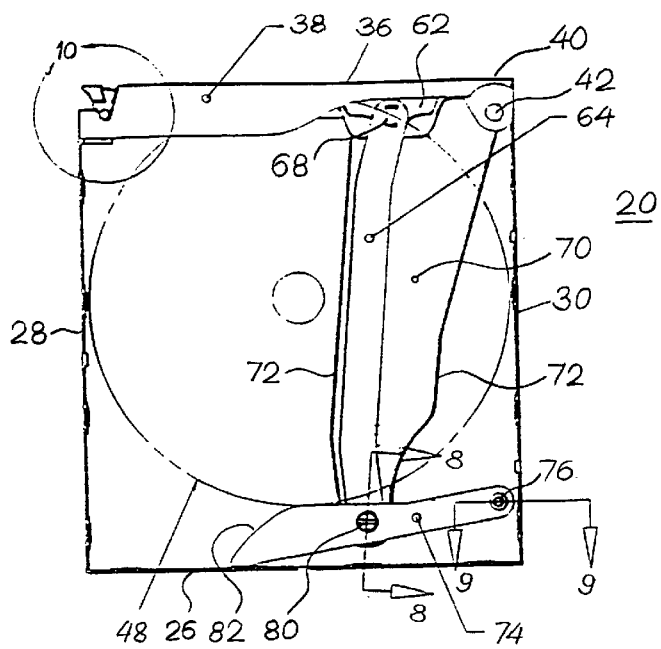
FIGS. 6 and 7 are a schematic back view of the container according to the present invention, a back cover being removed, showing the container with a closed and opened lid, respectively.

With reference to FIGS. 1, 6, 7, 12, and 13, an ejectable compact disc container (which term for the purposes of the present invention defines the container capable of ejecting a compact disc stored therein) includes a housing, preferably in the form of a parallelepiped, indicated generally at 20. It is preferably made of plastic. The housing 20 has a front panel 22, a back panel 24 (shown in fragments thereof in FIGS. 3, 5, 8, 9, and 11), a bottom wall 26 (shown in a fragment thereof in FIG. 8), and a pair of sidewalls 28 and 30. For the reason that will be explained in more detail further below, the front cover 22 is preferably made clear. The bottom wall 26 and side walls 28 and 30 are formed each of two portions, one of which is made integrally with the front panel 22, whereas another portion is made integrally with the back panel 24. One of those portions is made with beak-like projections, or tabs 32 (FIG. 5), evenly distributed over the perimeter of the front panel 22, whereas the other is made with step-like recessions 34 to receive and be engaged by those projections 32. In this way, the front panel 22 and the back panel 24 are fastened to each other. A top wall 36 including a lid 38 is pivotally secured by its end 40 at the housing 20 and thus is adapted to turn around an axis 42 (FIGS. 3, 6).

Figure 4:
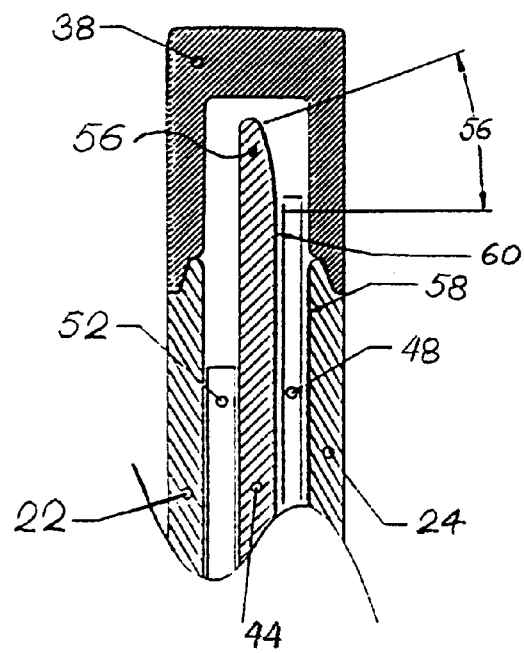
FIG. 4 is an enlarged partial cross-sectional view taken along line 4—4 of FIG. 1.

Located inside the housing 20 is a center divider 44. It is embedded in the side walls 28 and 30, as, for the wall 30, shown in FIGS. 3 and 9, and has its plane preferably parallel to those of the front 22 and back 24 panels. Thus, two compartments are formed inside the housing 20: a compartment 46 between the center divider 44 and the back panel 24 that accommodates a compact disc 48, and a compartment 50 for reference literature 52 that is formed between the center divider 44 and the front panel 22. It is just for the reference literature to be visible through the front panel 22 that the latter is suggested to be made clear.

Where the central divider 44 is adjacent to the lid 38, there is a lead-in area 54 (FIG. 4) formed by a beveled edge 56 of the divider 44, which area facilitates disc's entering the compartment 46. In the compartment 46, an inside surface 58 of the back panel 24 and an opposite surface 60 of the divider 44 are covered with a lining that protects and cleans the compact disc.

Figure 7:
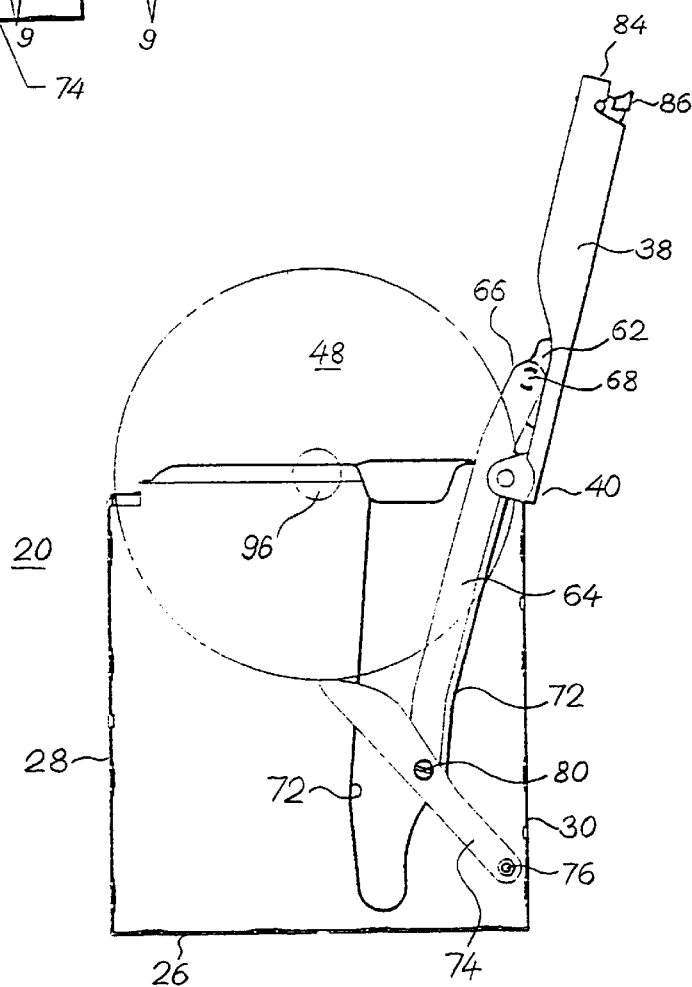
Figure 8:
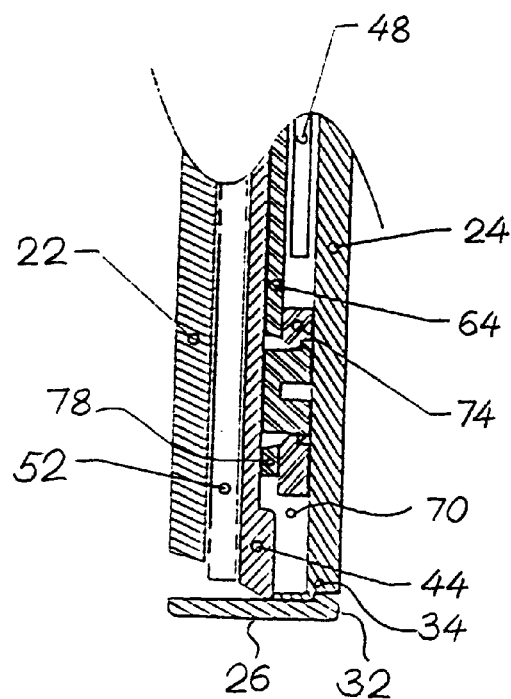
FIG. 8 is an enlarged partial cross-sectional view taken along line 8—8 of FIG. 6.
Figure 9:
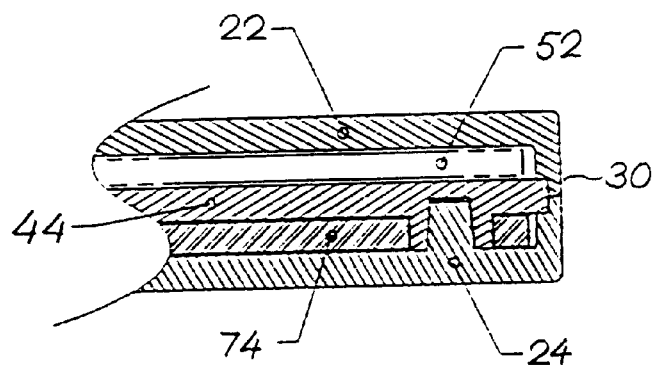
FIG. 9 is an enlarged partial cross-sectional view taken along line 9—9 of FIG. 6.
Figure 11:
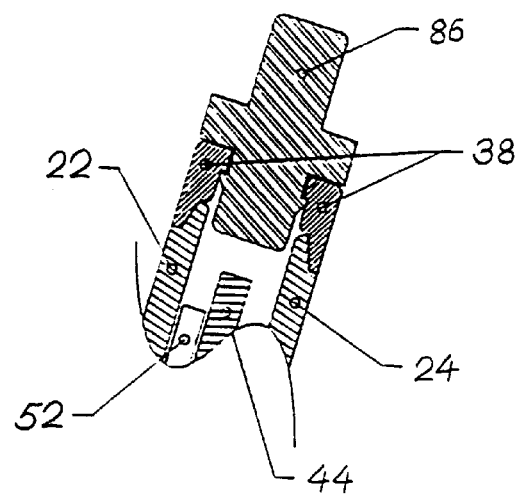
FIG. 11, is a partial cross-sectional view taken along line 11—11 of FIG. 10.

The lid 38 is provided with an arm 62 (FIGS. 6, 7), to which an ejector link 64 is pivotally attached by its end 66 so it can turn around an axis 68 whenever the lid 38 turns around its axis 42. The divider 44 is made with a depressed area 70 (FIG. 8), whose boundaries are indicated in FIGS. 6 and 7 with a reference 72. The ejector link 64 is recessed into the area 70. In its extreme positions, the ejector link 64 is adjacent to either of the opposite boundaries 72 (FIGS. 6 and 7, respectively).

At a lower area of the housing 20 and adjacent to the bottom wall 26, an ejector arm 74 is placed. It is pivotally attached to the divider 44 at 76 and is also pivotally secured to another end 78 (FIG. 8) of the ejector link 64 at 80. Spatially, the ejector arm 74 is located within the disc compartment 46 and outside the depression area 70. An upper (as viewed in FIG. 6) surface 82 of the ejector arm 74 is made into a cam-like shape to ensure its smooth interaction with the disc 48.

Figure 10:
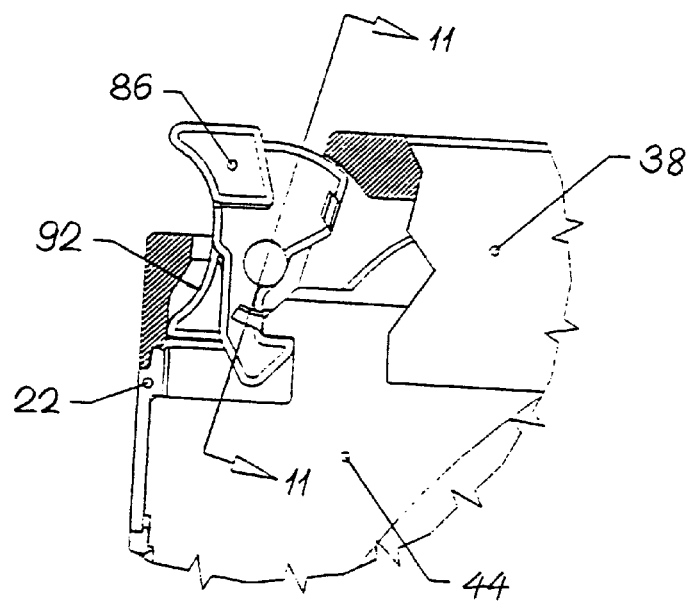
FIG. 10 is an enlarged view of a portion 10 of the container as shown in FIG. 6.
Figure 13:
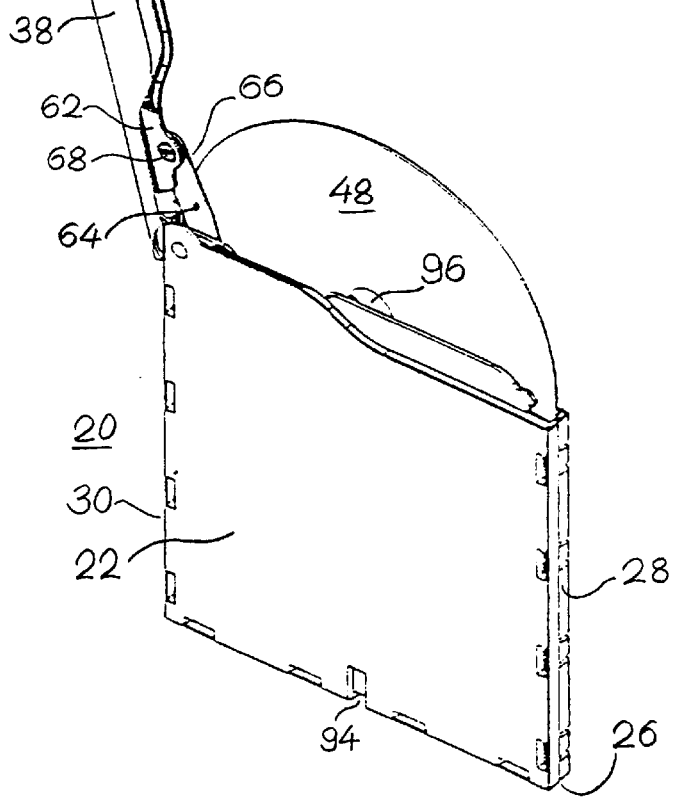

Pivotally attached to the lid 38 at another end 84 thereof is a latch 86 (FIGS. 7, 10, 13). By its tooth 88, the latch 86 engages a flange 90 of the divider 44 being urged to remain at this closed position of the lid 38 by the force of a living spring 92. The heavy-duty latch, along with substantially large hinges contribute to durability of the container.

Figure 1:
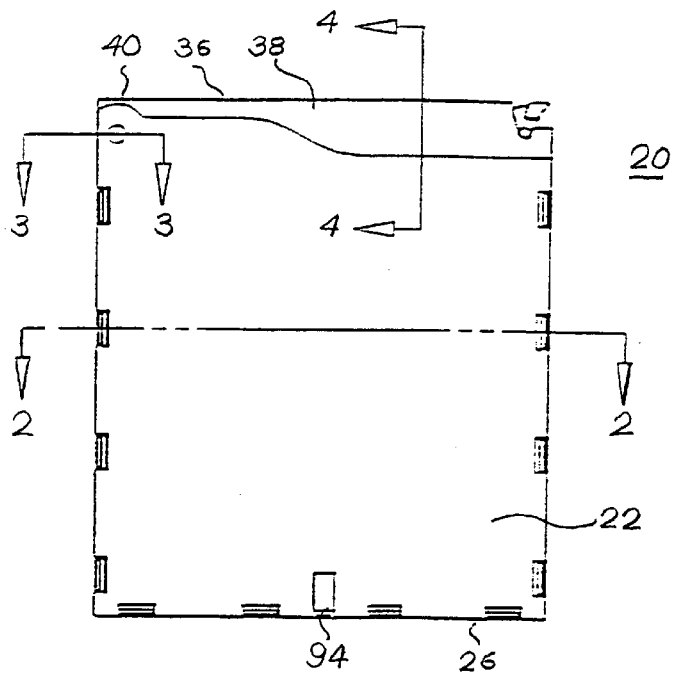
FIG. 1 is a schematic front view of a container in accordance with the present invention.
Figure 2:
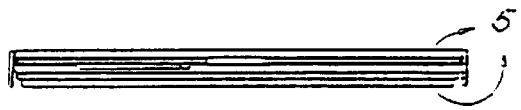
FIG. 2 is a cross-sectional view taken along line 2—2 of FIG. 1.
Figure 12:
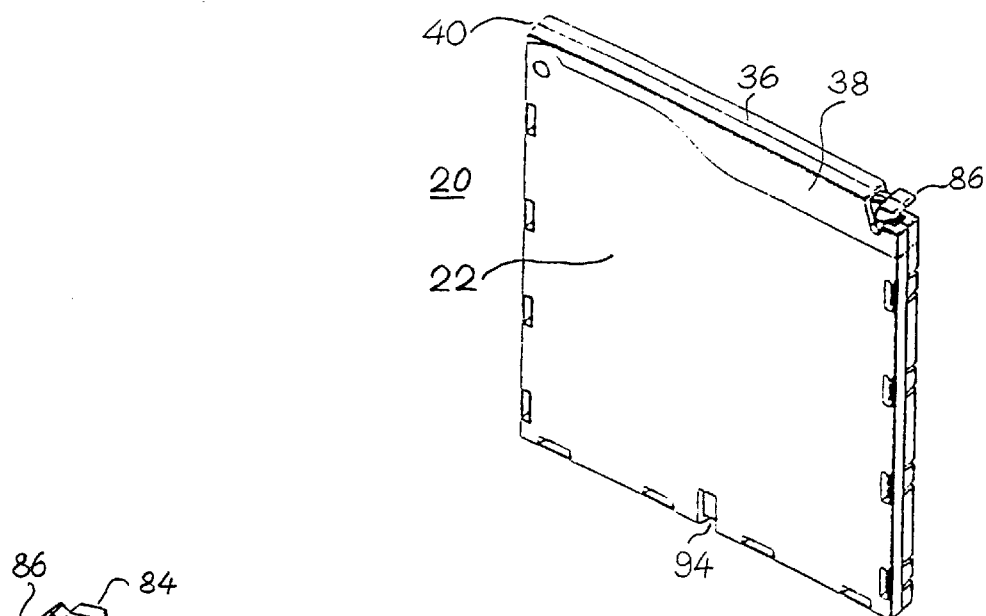
FIGS. 12 and 13 are schematic perspective views of the container according to the present invention that show the container with a closed and opened lid, respectively.

Also shown in FIGS. 1, 12, and 13 is a notch 94 used to facilitate pushing the literature 52 out of the case.

In action, when opening the case and removing the disc, the latch 86 is rotated upward from its closed position to unlock the lid 38. The latch 86 is briefly held open while lifting the lid 38. As the latch 86 is released, the living spring 92 returns it to "locked" position. Upon lifting the lid 38 open, the ejector link 64 carried along by the lid 38 pulls the ejector arm 74 upward, which in turn pushes the compact disc 48 upward. As the disc 48 is being ejected, the protective linings on the surfaces 58, 60 clean the disc. The cam-like surface 82 of the ejector arm 74 always contacts the disc 48 at the bottom in order to apply upward motion. The dimension ratio between the ejector link 64 and ejector arm 74, as well as the stroke of the ejector link 64 between its extreme positions at the full-open and full-closed positions of the lid 38 are selected in such a way that the disc 48 be ejected past its center hole 96 to facilitate its easy removal.

The lid 38 can be held in the open position by a detent (not shown).

When inserting the disc 48 into the case, with the lid 38 in full-open position, the disc is let lie against the beveled edge 56 of the center divider 44 and gently slide into the disc compartment 46 until it contacts the ejector arm 74 by its edge. Upon closing the lid 38, as the ejector arm 74 is moving toward the bottom wall 26, the disc 48 is being let more space to slide further so its inserting into the case is being controlled insuring its safety. After the lid 38 is closed, the spring-actuated latch 86 locks the lid automatically.

With respect to the above disclosure, it is appropriate to summarize the following advantages of the container resulting from the present invention:

- the container enables simple, one-handed operation, the feature being especially useful for retrieving a CD while operating a motor vehicle;
- container dimensions are identical to existing CD jewel boxes, thus allowing the container to be stored in any conventional multi-unit storage or carrying case or cabinet, etc.;
- the container can be opened without removing it from a storage or carrying case;
- the container protects the CD by minimizing the possibility of dust entry;
- the CD is cleaned by the lining as it ejected from or inserted into the container;
- large hinges and heavy-duty latch mechanism provide durability;
- full-open lid detent holds the lid open for easy removal or insertion of the disc;
- transparent literature compartment accepts any standard sized CD literature.

With regard to the embodiment of the present invention that was disclosed hereinabove, it is to be understood that this embodiment is given by example only and not in a limiting sense. Those skilled in the art may make various modifications and additions to the embodiment chosen to illustrate the invention without departing from the spirit and scope of the present contribution to the art. Accordingly, it is to be realized that the patent protection sought and to be afforded hereby shall be deemed to extend to the subject matter claimed and all equivalence thereof fairly within the scope of the invention.

What is claimed is:

1. An ejectable compact disc container, comprising a housing, an ejector arm, and an ejector link, said housing being made as a parallelepiped with a front panel, a back panel and a top, a bottom, and two side walls, said top wall being articulated on one of said two side wall thereof to one of said sidewalls, thus constituting a lid thereof;

said ejector arm being located in said housing, adapted to engage an edge of said compact disc distant from said lid, and operable through a pivotal connection to said ejector link;

said ejector link being adapted to be actuated by said lid, whereby said compact disc is being received into said housing upon closing said lid and pushed out of said housing upon opening said lid.

2. The container according to claim 1, further comprising a divider placed within said housing, a plane of said divider being substantially parallel to planes of said front and back panels, whereby two compartments are formed within said housing, one of said compartments accommodating said compact disc.

3. The container according to claim 2, wherein said ejector arm and said ejector link are located in said one of said compartments that accommodates said compact disc.

4. The container according to claim 2, wherein a surface of said back panel and a surface of said divider facing each other are covered with a protective lining.

5. The container according to claim 2, wherein an edge of said divider adjacent to said lid is beveled to form a lead-in area for said compact disc.

6. The container according to claim 2, wherein said one of said compartments accommodating said compact disc is located between said divider and said back panel.

7. The container according to claim 2, wherein another of said compartments is located between said divider and said front panel, and said front panel is made clear to thus allow contents of said another compartment to be visible therethrough.

8. The container according to claim 1, wherein a dimension a ratio between said ejector link and said ejector arm, and a stroke of said ejector link between extreme positions thereof at a full-open and full-closed positions of said lid are selected in such a way that said compact disc be ejected past a center hole thereof to facilitate easy removal of said disc.

9. A compact disc container, comprising a housing and means for ejecting a compact disc from said housing, said housing being made as a parallelepiped closed on five of six sides, a sixth side of said housing being articulated on one end of said sixth side thereof to a lateral side of said housing, thus constituting a lid thereof;

said ejecting means engaging a compact disc and being operated by said lid, whereby said compact disc is being received into said housing upon closing said lid and pushed out of said housing upon opening said lid.

\* \* \* \* \*